J. STANLEY.
VEHICLE WHEEL.
APPLICATION FILED MAY 14, 1917.
1,261,866.
Patented Apr. 9, 1918.
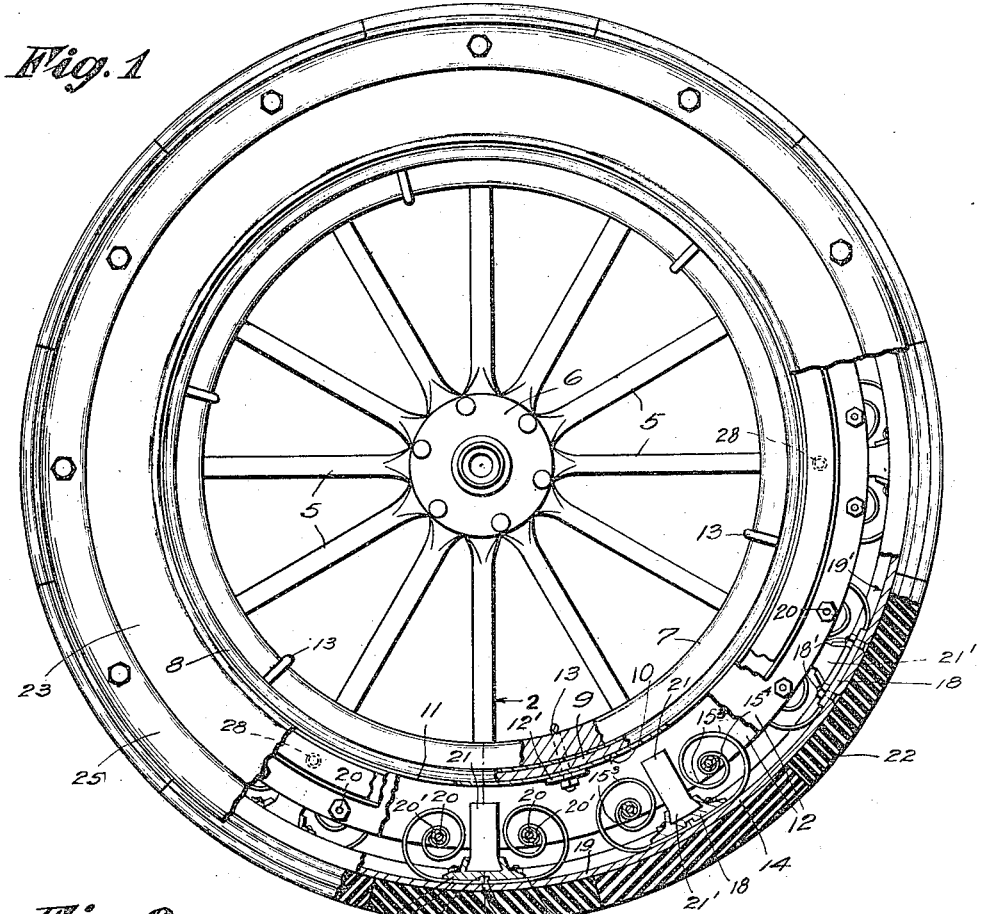
Fig. 1
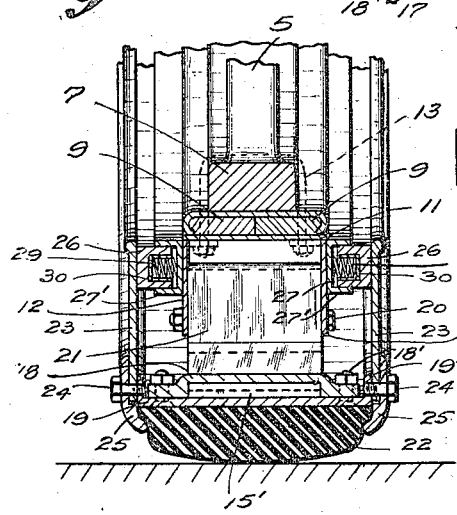
Fig. 2
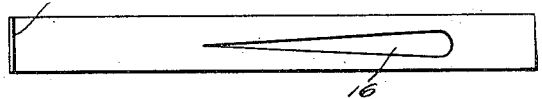
Fig. 3
Fig. 4
INVENTOR
John Stanley.
BY
Pierre James
ATTORNEY

UNITED STATES PATENT OFFICE.

JOHN STANLEY, OF SEATTLE, WASHINGTON.

VEHICLE-WHEEL.

1,261,866.   Specification of Letters Patent.   Patented Apr. 9, 1918.

Application filed May 14, 1917. Serial No. 168,352.

*To all whom it may concern:*

Be it known that I, JOHN STANLEY, a citizen of the United States, residing at Seattle, in the county of King and State of Washington, have invented certain new and useful Improvements in Vehicle-Wheels, of which the following is a specification.

This invention relates to vehicle wheels. Its primary object is to provide resilient or elastic means whereby solid rims or tires may be used with wheels, and possess the desirable features of wheels having pneumatic tires and obviate their disadvantages.

A further object is to provide a wheel having relatively movable rims with springs which are constructed and applied to most effectually distribute the strains and stress to which they are subjected, whereby shocks are eliminated and their durability prolonged.

A further object is the provision of improved means for protecting the springs from dirt or becoming injured by being struck by external objects and without appreciably impairing the resiliency of the wheel.

With these and other ends in view, the invention consists in the novel construction, adaptation and combination of parts, as will be hereinafter described and claimed.

In the accompanying drawings, Figure 1 is a view partly in side elevation and partly in section of a wheel embodying my invention. Fig. 2 is a sectional view taken on line 2—2 of Fig. 1. Fig. 3 is a blank from which a rim-supporting spring is formed. Fig. 4 is a perspective view of one of the springs.

Referring to the drawings, the numeral 5 designates the spokes connecting the hub 6 with a rim member 7 which, as illustrated, is surrounded by a channeled metal rim member 8 which may be similar to what is ordinarily used for connecting a pneumatic tire to a wheel.

Where a channeled rim member of this character is used, filling pieces, such as 9, are employed to furnish an unbroken peripheral surface 10. Mounted upon the latter is a plate ring 11 which, in turn, has mounted thereon annular plates 12 disposed in planes perpendicular to the wheel axis.

13 represents U-bolts extending through apertured ears $12^1$ of said plates and the ring 11 to rigidly secure the same to the aforesaid wheel rim which, for clearness, will be hereinafter designated as the inner rim.

14 represents a second or outer rim which is connected with the plates 12 by means of a series of springs of the so-called "flat spiral" type. These springs are each formed of a plate, Fig. 3, having a hook $15^1$ at one end and provided with a substantially triangular-shaped slot 16 having its apex directed toward the hook end of the plate so that when the plate is coiled, as in Fig. 4, the material within the spring will be disposed so that the strains to which the spring is subjected will be distributed approximately evenly throughout the same.

The springs are arranged in pairs, as shown in Fig. 1, the hooked ends of the associated ones abutting each other and engaging in slots 17 provided in the undersides of chairs 18; said chairs serving to hold the tongue elements $15^2$ of the springs against the inner peripheral surface $19^1$ of the outer rim while the chairs themselves are secured to said rim by bolts $18^1$.

Each of the springs is formed with two or more coils or scrolls, indicated by $15^3$, which terminate in a loop $15^4$. Headed bolts 20 extend through holes provided in the plates 12 and through plate-spacing tubes $20^1$ which extend through the respective spring loops $15^4$. The complementary members of each pair of springs are disposed in opposite circumferential directions so that the strains thereon are equalized and capable of resisting flexure equally in either of such directions.

Intermediate the coil elements of each pair of springs is a cushion or bumper block 21 having a dovetail portion $21^1$ which fits into a correspondingly shaped recess of the respective chair. These cushion blocks are formed of rubber or other suitable elastic material and of heights less than the space between the two rims and of widths equal to the distance between the plates 12.

22 represents a tire of rubber or other suitable material provided on the outer peripheral surface of the outer rim 19.

Included in the invention are devices which serve with the two rims as a casing to protect the resilient connections between the rims. Said devices consist of annular plates 23 secured adjacent to their outer peripheries to the outer rim 19 by means of screw bolts 24 engaging in threaded holes provided in flanges $19^2$ of the rim 19. These screw bolts also serve to detachably connect to plates 23 rings 25 whereby the tire 22 is demountably secured to the rim 19.

Interposed between the adjacent plates 12 and 23 are dust-excluding devices comprising annular packing members 26 movable axially of the wheel axis in annular grooves 27 provided in ring attachments 27¹ which are rigidly secured to the plates 12, as by rivets, indicated by dotted lines 28 in Fig. 1.

Helical springs 29 provided, desirably, in metal bushing 30 in recesses of the packing members, serve to yieldingly hold the latter against the respective casing plates 23. Said packing members contribute with the ring attachments 27¹ to close the gap between the plate members 12 and 23 without interfering with movements of the outer wheel parts with respect to the inner wheel parts.

It is to be noted that by employing springs having two or more coils to bolts secured to the plate elements 12 and disposed in the manner explained, that they mutually participate in yieldingly retaining the outer rim and the parts carried thereby so as to furnish an easy running wheel in which are absorbed shocks due to the wheel encountering obstacles or traveling over a rough surface.

The invention is of simple construction and should prove durable and efficient in operation.

What I claim, is—

In a vehicle wheel, an inner rim, annular plate elements rigidly connected thereto, an outer rim, a series of flat spiral springs having bent ends interposed between the two rims and connected to the plate elements of the inner rim, adjacent ones of said springs being oppositely arranged circumferentially of the wheel, chairs having slots in their outer sides bolted to the outer rim for securing said springs to the inner periphery of the latter, each of such chairs serving for two springs to receive in the slot thereof, the bent ends of the springs, and cushion blocks carried by the respective inner faces of the chairs for limiting relative movements of the two rims radially of the wheel.

Signed at Seattle, Wash., this 5th day of May, 1917.

JOHN STANLEY.

Witnesses:
PIERRE BARNES,
E. PETERSON.

Copies of this patent may be obtained for five cents each, by addressing the "Commissioner of Patents, Washington, D. C."